(12) United States Patent
Baranovskiy

(10) Patent No.: US 11,611,679 B2
(45) Date of Patent: Mar. 21, 2023

(54) PRECISE CIRCULAR HALFTONES

(71) Applicant: Adobe Inc., San Jose, CA (US)

(72) Inventor: Dmytro Baranovskiy, Sydney (AU)

(73) Assignee: Adobe Inc., San Jose, CA (US)

(*) Notice: Subject to any disclaimer, the term of this patent is extended or adjusted under 35 U.S.C. 154(b) by 20 days.

(21) Appl. No.: 17/466,689

(22) Filed: Sep. 3, 2021

(65) Prior Publication Data

US 2022/0368809 A1    Nov. 17, 2022

Related U.S. Application Data

(60) Provisional application No. 63/188,929, filed on May 14, 2021.

(51) Int. Cl.
| | | |
|---|---|---|
| *H04N 1/40* | (2006.01) | |
| *G06T 11/00* | (2006.01) | |
| *G06T 11/40* | (2006.01) | |
| *G06T 11/60* | (2006.01) | |
| *G06T 7/90* | (2017.01) | |
| *G09G 5/02* | (2006.01) | |
| *H04N 1/405* | (2006.01) | |

(52) U.S. Cl.
CPC .......... *H04N 1/4051* (2013.01); *G06T 7/90* (2017.01); *G06T 11/40* (2013.01); *G06T 11/60* (2013.01); *G06T 2200/24* (2013.01)

(58) Field of Classification Search
CPC ...... H04N 1/4051; H04N 1/4058; H04N 1/48; H04N 1/52; H04N 5/202; H04N 5/57; G09G 5/02; G09G 2320/06; G06T 11/001; G06T 7/90; G06T 11/40; G06T 11/60; G06T 2200/24
USPC .......................................................... 345/596
See application file for complete search history.

(56) References Cited

U.S. PATENT DOCUMENTS

| 5,463,471 A * | 10/1995 | Chou ................ H04N 1/4058 358/533 |
| 6,346,993 B1 * | 2/2002 | Curry ............... H04N 1/4058 358/1.9 |
| 9,160,887 B2 * | 10/2015 | Yoshida ........... G06K 19/06037 |
| 2006/0238813 A1 * | 10/2006 | Jones .................... B41J 3/4071 |

* cited by examiner

*Primary Examiner* — Wesner Sajous
(74) *Attorney, Agent, or Firm* — Nicholson De Vos Webster & Elliott LLP

(57) ABSTRACT

Embodiments are disclosed for generating a vector object that comprises a precise circular halftone representation of an input image. A method of precise circular halftone generation includes receiving an input image, dividing the image into a grid comprising a plurality of cells, determining a color of a portion of the input image associated with a first cell, determining a radius of circular halftone elements to represent the color associated with the first cell, and generating a path object representing the portion of the input image using circular halftone elements having the determined radius.

20 Claims, 17 Drawing Sheets

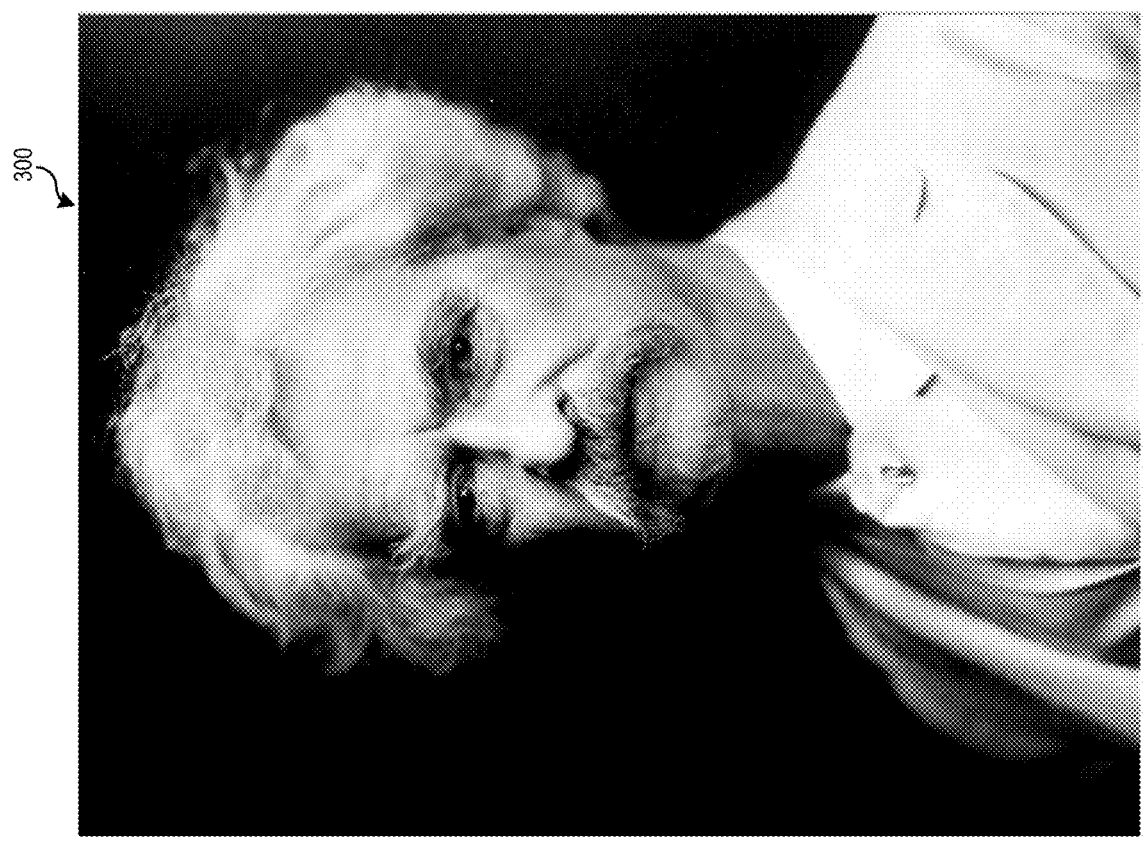
FIG. 3

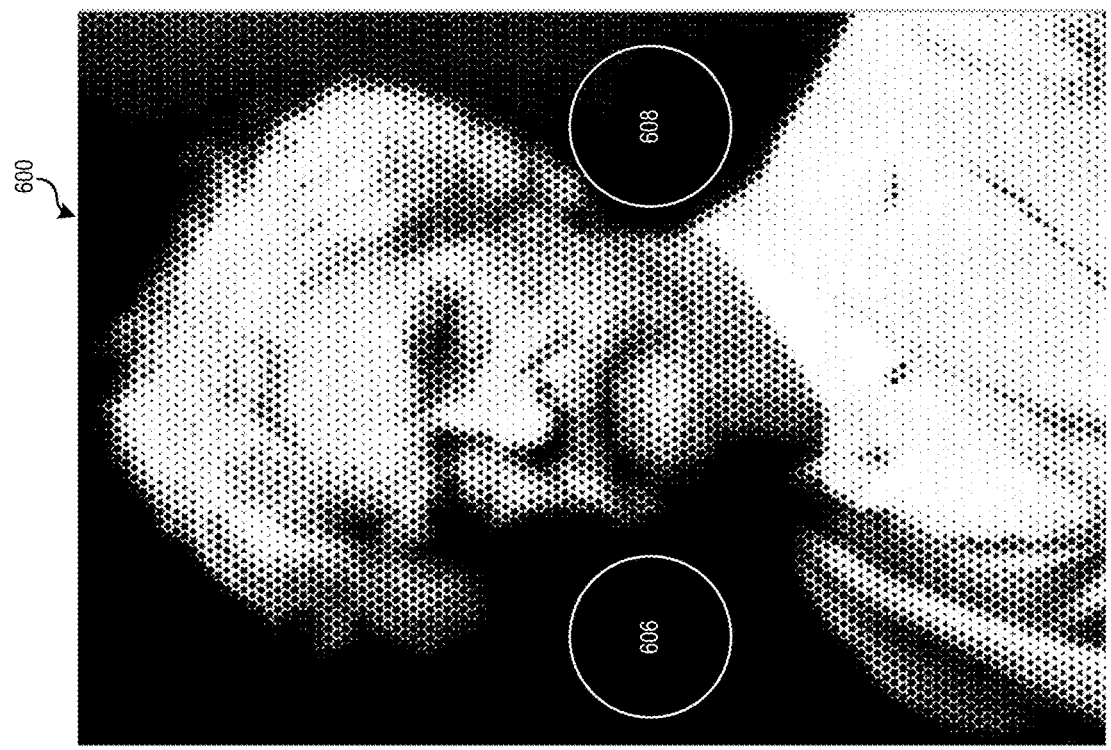
FIG. 6

FIG. 7

FIG. 8

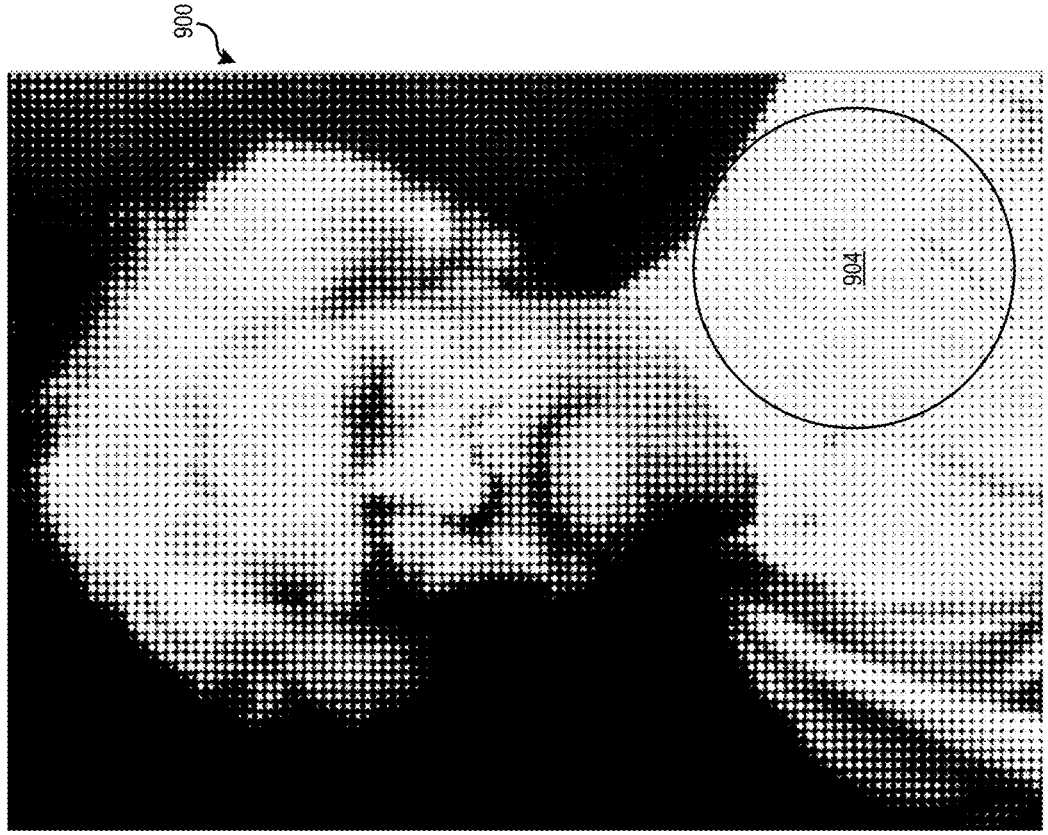
FIG. 9

1000

$$f(r) = \frac{\pi r^2 \left(r^2 \arccos\left(1 - \frac{m}{r}\right) - (r-m)\sqrt{2mr - m^2}\right)}{a^2} \left\{0 < r \leq \frac{a\sqrt{2}}{2}\right\}$$

$$m = max\left(0, \frac{2r-a}{2}\right)$$

1002 $\quad \frac{\pi x^2}{a^2} \left\{0 < x \leq \frac{a}{2}\right\}$

1004 $\quad d_3 = \frac{\pi - 4}{a^2(3 - 2\sqrt{2})}$

1006 $\quad d_3\left(x - \frac{a\sqrt{2}}{2}\right)^2 + 1 \left\{\frac{a}{2} < x < \frac{a\sqrt{2}}{2}\right\}$ 1008 $\quad \sqrt{\frac{xa^2}{\pi}} \left\{0 < x < \frac{\pi}{4}\right\}$ 1010 $\quad \frac{ad_3\sqrt{2} + \sqrt{4d_3(x-1)}}{2d_3} \left\{\frac{\pi}{4} < x < 1\right\}$

$$u(r) = \frac{2\pi r^2 - 12\left(r^2 \arccos\left(1-\frac{m}{r}\right) - (r-m)\sqrt{2mr-m^2}\right)}{a^2\sqrt{3}} \left\{0 < r \leq \frac{a\sqrt{3}}{3}\right\}$$

$$m = max\left(0, \frac{2r-a}{2}\right)$$

1102  $\quad \dfrac{2\pi x^2}{a^2\sqrt{3}} \left\{0 < x \leq \dfrac{a}{2}\right\}$ 1104  $\quad d = \dfrac{6^2(\pi - 2\sqrt{3})}{a^2 2\sqrt{3}(3 - 2\sqrt{3})^2}$ 1106  $\quad d\left(x - \dfrac{a\sqrt{3}}{3}\right)^2 + 1 \left\{\dfrac{a}{2} < x < \dfrac{a\sqrt{3}}{3}\right\}$ 1108  $\quad \sqrt{\dfrac{xa^2\sqrt{3}}{2\pi}} \left\{x < \dfrac{\pi}{2\sqrt{3}}\right\}$ 1110  $\quad \dfrac{\frac{2da\sqrt{3}}{3} + \sqrt{\frac{4a^2d^2}{3} - 4d\frac{a^2d+3-3x}{3}}}{2d} \left\{x > \dfrac{\pi}{2\sqrt{3}}\right\}$

*FIG. 11*

PRECISE CIRCULAR HALFTONES

CROSS-REFERENCE TO RELATED APPLICATIONS

This application claims the benefit of U.S. Provisional Application No. 63/188,929, filed May 14, 2021, which is hereby incorporated by reference.

BACKGROUND

Due to media limitation or out of artistic need, sometimes a designer only has two colors: black and white, without any shades of grey in between. Historically, for an image representation in such circumstances a half toning technique is used. However, tools for digital creation of such images, especially in vector form, suffer from a number of drawbacks. For example, conventional techniques lack the ability to represent especially dark or light areas where circular halftone elements overlap.

These and other problems exist with regard to generating precise circular halftones in electronic systems.

SUMMARY

Introduced here are techniques/technologies that generate precise circular halftone vector representations of input images. For example, a user may provide an input image which includes a representation of one or more objects. The user can specify one or more halftone parameters, such as distance, pattern type, halftone element shape, etc. to be used when generating a halftone representation of the input image. Based on the pattern type, a grid is applied to the input image. The grid may be a square grid, hexagonal grid, etc. For each cell of the grid, a color value is determined. This may be performed by determining an average color value of the pixels in the grid. Using this color value, a radius of the halftone elements in that cell are determined. This may be performed iteratively for each cell of the grid.

Unlike conventional systems, where the radius of circular halftone elements are limited by the radii of neighboring circular elements, in various embodiments the radii of circular halftone elements may be selected to achieve the proper color value, creating a more accurate representation of the original image. This may result in overlapping halftone elements. Embodiments account for the overlap when determining the radius of the elements that represent the color of a given cell.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 3 illustrates an example image and corresponding halftone image;

FIGS. 6-9 illustrate examples of precise halftone images, in accordance with one or more embodiments;

FIGS. 10 and 11 illustrate equations related to precise halftone generation, in accordance with one or more embodiments;

DETAILED DESCRIPTION

One or more embodiments of the present disclosure include a content design system that generally facilitates the creation, modification, sharing, and/or deletion of graphical content including vector-based content. The content design system may be configured to generate precise circular halftone vector representations of input images.

As discussed, conventional techniques lack the ability to represent especially dark or light areas when using non-tesselatable halftone elements, such as circular elements. As a result, conventional systems expand the non-tesselatable elements until they touch neighboring elements. This leaves gaps between the elements, preventing these conventional systems from accurately representing very dark or very light areas of an image.

To address these and other deficiencies in conventional systems, embodiments perform automatic vector halftone image generation from a given picture by scaling non-tesselatable elements up until they overlap adjacent elements. This creates a more accurate representation of the original image, especially for absolute black or white areas. Although embodiments are generally described with respect to circular halftone elements, embodiments may be used with any other non-tesselatable halftone elements. Non-tesselatable elements may include any elements that have to overlap in order to fully cover a surface.

Figure 1:
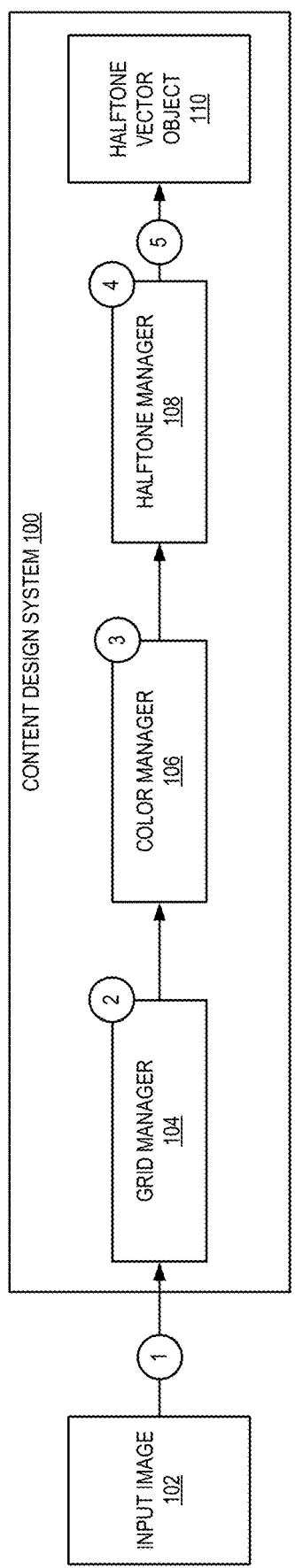
FIG. 1 illustrates a diagram of a process of precise halftone generation in accordance with one or more embodiments.

FIG. 1 illustrates a diagram of a process of precise halftone generation in accordance with one or more embodiments. As shown in FIG. 1, a content design system 100 can receive an input image 102 at numeral 1. Input image 102 can be a digital image. For example, as used herein, the term "digital image" refers to any digital symbol, picture, icon, or illustration. For example, the term "digital image" includes digital files with the following, or other, file extensions: JPG, TIFF, BMP, PNG, RAW, or PDF. The term "digital image" also includes one or more images (e.g., frames) in a digital video. Accordingly, although much of the description herein is phrased in terms of digital images, it will be appreciated that the disclosure can also apply to editing digital video.

In some embodiments, the user can select the input image 102 from an image store (e.g., on their device, such as a camera roll, file system, or application, etc., or from a storage service, such as a remote file system, cloud-based storage service, etc.). The input image 102 may include a black and white, monochromatic, or color image. Once the image is obtained by the content design system 100, the user can request that a halftone vector object be generated that represents the input image 102. For example, the user may select a "generate halftone" button, menu item, or other user interface element. In some embodiments, the user may also select options associated with the halftone object being generated or may not specify one or more options and have default options used. For example, the user may select the grid shape (e.g., square, hexagonal, etc.), the halftone element shape (e.g., circles, etc.), color (e.g., black on white, white on black, etc.) or other options.

At numeral 2, grid manager 104 can apply a grid to the input image 102. For example, if no specific grid shape is specified by the user, then a default grid shape may be applied. The grid shape may include square, hexagonal, etc. Additionally, the size of the grid may be a default value, or a value specified by the user or other entity. Once the grid has been applied to the input image 102, then color manager 106 can determine the color of each cell of the grid at numeral 3. For example, an average color of the pixels in a cell of the grid may be determined. This may be the mean color, the median color, the modal color, or other combination of color values within the cell. In the examples discussed herein, black and white images are used, as a result the color of any given cell may range from black to white with shades of grey in between. However, in some embodiments, full color or different monochromatic color images may be similarly processed.

Once the cell color has been determined by color manager 106, at numeral 4 halftone manager 108 determines the appropriate size of the halftone elements to replicate that color in halftones. For example, where the halftone element is dark on a light background, lighter shades may be represented with smaller radius halftone elements and darker shades may be represented with larger radius halftone elements. In prior techniques, for circular halftone elements, this results in a maximum darkness level (or minimum lightness level) dictated by the radius at which adjacent circular elements contact one another. This leads to a poorer representation of the underlying image and can result in a loss of detail.

Figure 2:
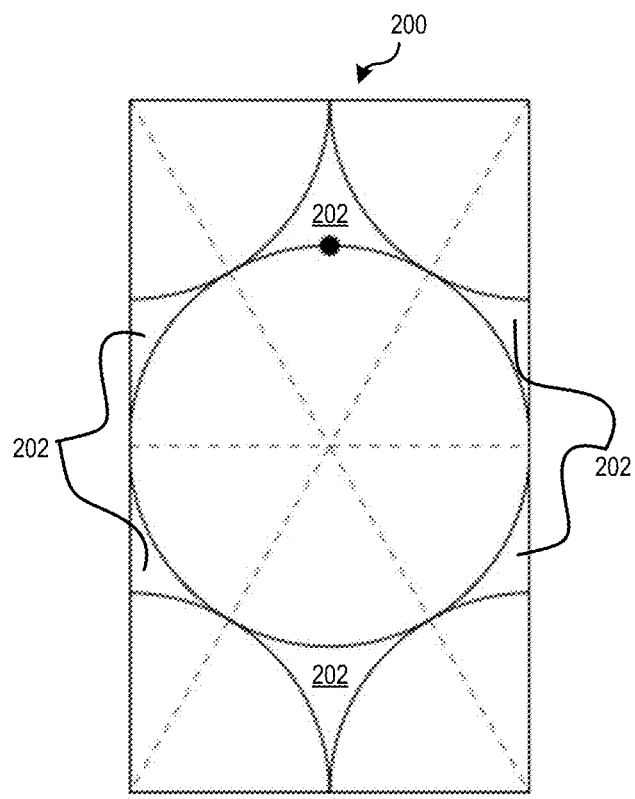
FIG. 2 illustrates a diagram of a dot pattern for halftone generation.

FIG. 2 illustrates a diagram of a dot pattern for halftone generation. As shown in FIG. 2, a single cell 200 can include a halftone element centered and then portions of other halftone elements. In this example, the radius of the halftone elements is limited such that the circular elements do not overlap. This results in areas 202 of the cell that cannot be covered by the halftone elements, reducing the range of shades that can be accurately represented in halftones. This is further depicted in FIG. 3.

FIG. 3 illustrates an example image and corresponding halftone image. As shown in FIG. 3, a black and white image 300 is an original digital image and halftone image 302 is a halftone representation of image 300 created using conventional techniques. As shown, because conventional techniques are limited to halftone elements that do not overlap, the halftone image cannot reproduce the blacks of the original image, resulting in a dark shade of grey as the background.

Figure 4:
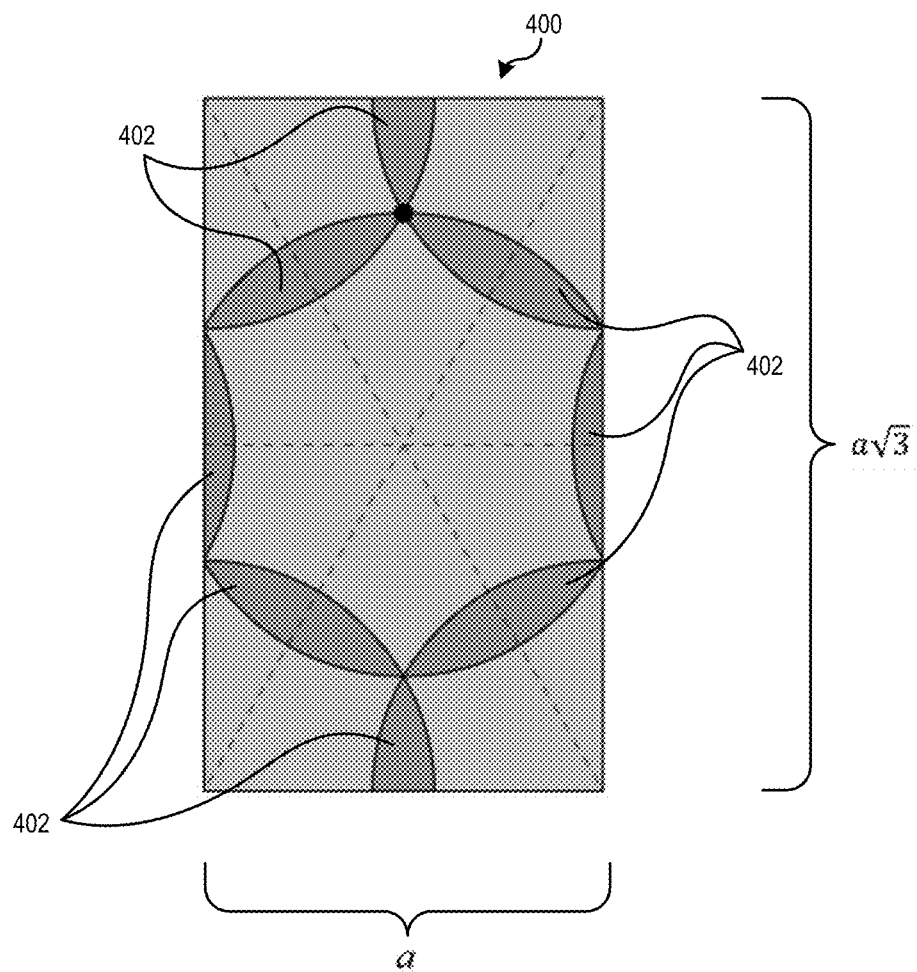
FIG. 4 illustrates a diagram of a dot pattern for halftone generation, in accordance with one or more embodiments.

FIG. 4 illustrates a diagram of a dot pattern for halftone generation, in accordance with one or more embodiments. When using a circular halftone element, a polka dot pattern is formed. These elements are arranged in equilateral triangles, such that the center of each element corresponds to a vertex of an equilateral triangle. This results in rows of circles having a horizontal step a and a vertical step $$\frac{a\sqrt{3}}{2}.$$

This results in a tessellation area 400 of a rectangle with width a and height $a\sqrt{3}$. As long as the circles are not colliding e.g., $$r < \frac{a}{2},$$

the area taken by circles could be calculated as $2\pi r^2$. As soon as they overlap, this results in six "lens" shapes 402. Total area of those shapes can be calculated using this formula:

$$l = 12\left(r^2 \arccos\left(\frac{a}{2r}\right) - \left(r - \frac{2r-a}{2}\right) \cdot \sqrt{2r\frac{2r-a}{2} - \left(\frac{2r-a}{2}\right)^2}\right)$$

The maximum value of the radius is $$\frac{a\sqrt{3}}{2}.$$

After this value, no gaps are visible between circles. The darkness rate of the pattern is a relation of the dark area to the whole are, which is calculated as:

$$R = \frac{2\pi r^2 - l}{a^2\sqrt{3}}$$

As such, if the circles do not overlap, then l is equal to 0. If the circles do overlap, then removing l from the area calculation accounts for this overlapping area.

Figure 5:
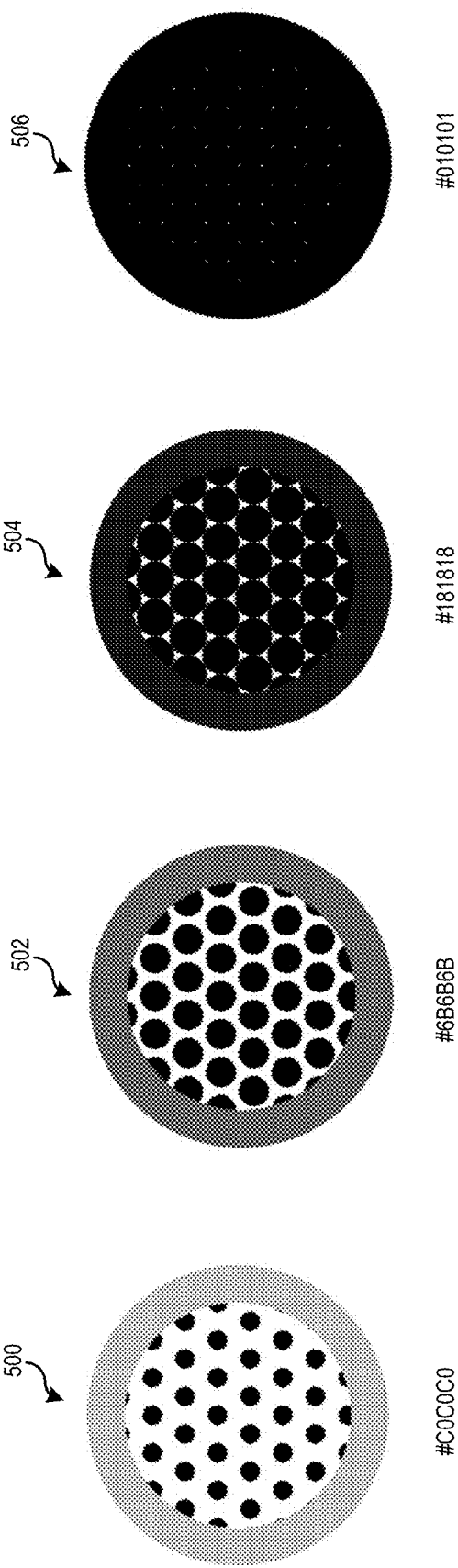
FIG. 5 illustrates examples of different shades represented by different halftone patterns, in accordance with one or more embodiments.

FIG. 5 illustrates examples of different shades represented by different halftone patterns, in accordance with one or more embodiments. As shown in FIG. 5, pattern 500 does not include any overlapping elements and results in a light grey color (e.g., #c0c0c0). In pattern 502, the radii of the elements have increased, increasing the darkness level represented by this pattern to a dark grey (e.g., #6b6b6b). Pattern 504 represents the darkest conventional systems are capable of representing, as the radii have been increased such that each element is now touching but not overlapping. This results in a very dark, but not black, grey (e.g., #181818). Embodiments enable the elements to overlap, resulting in darker shades being able to be represented, such as pattern 506 at almost black (e.g., #010101). Additionally, as discussed, the radii can be expanded until no gaps are left, allowing black (e.g., #000000) to be represented.

FIGS. 6-9 illustrate examples of precise halftone images, in accordance with one or more embodiments. As shown in FIG. 6, image 302 is processed using conventional techniques, whereas image 600 is processed using present embodiments. As a result, the background areas 602 and 604 of image 302 are not black, as they are limited in the range of shades that can be represented. However, because of the ability to overlap the halftone elements in various embodiments, the background areas 606 and 608 of image 600 are black, providing a better halftone representation of the original image.

As shown in FIG. 7, image 700 is processed using conventional techniques, with a white element over a black background. When using white elements, it can be seen that conventional techniques fail to properly represent light areas of the original image. For example, area 704 is not completely white due to the inability of conventional techniques to overlap halftone elements. In image 702, processed according to embodiments described herein, area 706 is white, providing a better halftone representation of the original image.

In FIGS. 6 and 7, a hexagonal grid is used for each image. In the examples of FIGS. 8 and 9, a square grid is used. As shown in FIG. 8, the background in conventionally processed image 800 is not entirely black. Image 802, processed according to the embodiments described herein, is capable of generating an entirely black background, by overlapping the halftone elements. FIG. 9 shows examples of halftone images generated using white elements on a black background in a square grid. Image 900, processed conventionally, suffers from a significant loss of detail in the jacket area 904, due to the more limited range of shades conventional systems are capable of representing. However, in image 902, processed according to embodiments described herein, the jacket region 906 has significantly more detail shown.

FIGS. 10 and 11 illustrate equations related to precise halftone generation, in accordance with one or more embodiments. FIG. 10 illustrates equations related to circle elements on a square grid. For example, equation 1000 is an equation for determining the shade represented by a pattern with circles of a given radius size on a square grid. For example, in equation 1000, for a given halftone element radius, r, a darkness value in the range of 0 to 1, inclusive is returned. Additionally, in equation 1000, a is a term indicating a size of a cell of the grid, and $$m = \max\left(0, \frac{2r-a}{2}\right).$$

This equation can be simplified using equations 1002-1006. For example, equation 1002 represents an approximation of equation 1000 before the arccosine term becomes dominant. Equations 1004 and 1006 represent an approximation of equation 1000 after the arccosine term becomes dominant. For example, equation 1004 computes a term, $d_3$, based on the grid size a. This term is then used in equation 1006 to approximate the equation 1000 after the arccosine term becomes dominant.

As discussed, embodiments determine a darkness level of a cell and then from that the radii of the halftone elements are determined. Accordingly, functions corresponding to the inverse of the above-described equations may be implemented by the content design system 100 (e.g., by the halftone manager or other component) in order to determine the appropriate size of the halftone elements. As such, equations 1008 and 1010 represent inverses of the above approximations. Using the inverse equations, 1008 and 1010, the darkness level, x, can be provided and the equation will provide a radius for the halftone elements to be used. Because these equations are inverse approximations of the function, the resulting halftone element radius is calculated with lower precision. However, by simplifying the calculations using the approximated functions, the calculation speed is improved, allowing for calculations to be performed in real time.

FIG. 11 illustrates equations corresponding to those in FIG. 10 but related to circle elements on a hexagonal grid. Equation 1100 is an equation for determining the shade represented by a pattern with circles of a given radius size on a hexagonal grid. For example, in equation 1100, for a given halftone element radius, r, a darkness value in the range of 0 to 1, inclusive is returned. Similarly to equation 1000 discussed above, in equation 1100, a is a term indicating a size of a cell of the grid, and $$m = \max\left(0, \frac{2r-a}{2}\right).$$

This equation can be simplified using equations 1102-1106. For example, equation 1102 represents an approximation of equation 1100 before the arccosine term becomes dominant. Equations 1104 and 1106 represent an approximation of equation 1100 after the arccosine term becomes dominant. For example, equation 1104 computes a term, d, based on the grid size a. This term is then used in equation 1106 to approximate the equation 1100 after the arccosine term becomes dominant. Equations 1108 and 1110 correspond to the inverses of equations 1102 and 1106 and may be implemented by the content design system (e.g., such as in the halftone manager, or other component described above), to determine the radius of halftone elements in a cell having a particular darkness value, x.

Figure 12:
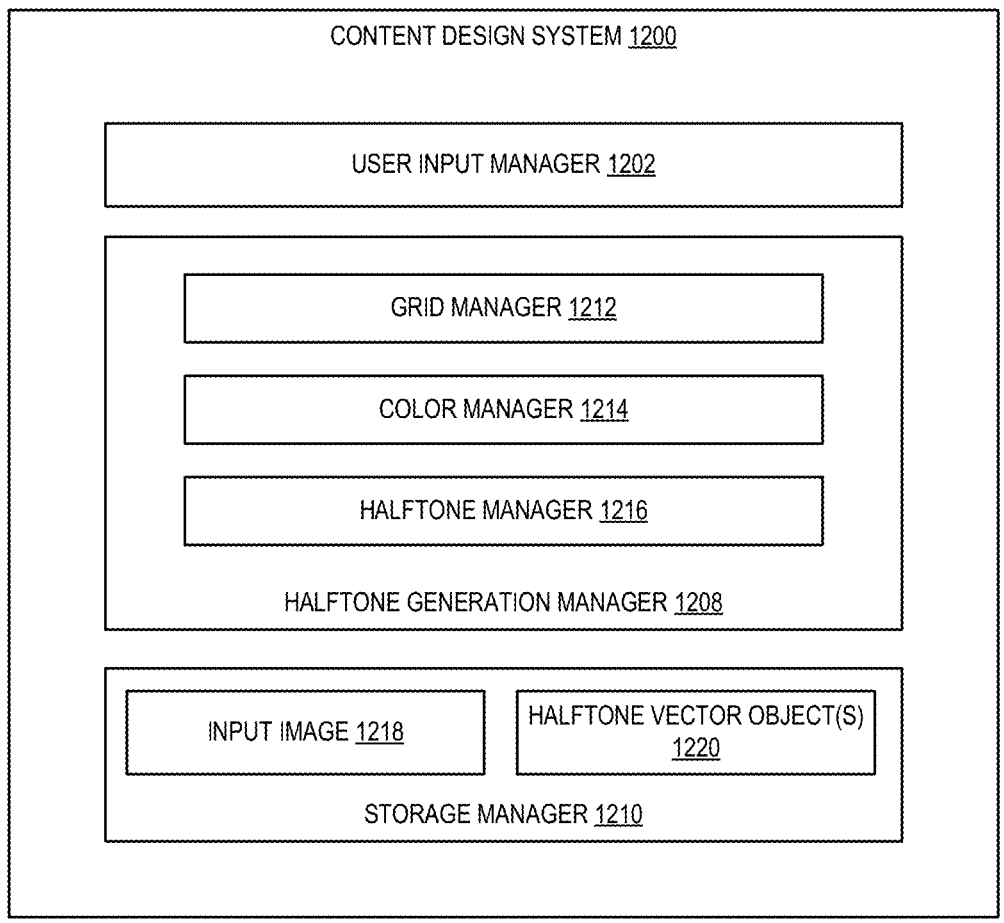
FIG. 12 illustrates a schematic diagram of a content design system in accordance with one or more embodiments.

FIG. 12 illustrates a schematic diagram of content design system (e.g., "content design system" described above) in accordance with one or more embodiments. As shown, the content design system 1200 may include, but is not limited to, a user input manager 1202, a halftone generation manager 1208, and a storage manager 1210. The halftone generation manager 1208 include a grid manager 1212, a color manager 1214, and a halftone generation manager 1208. The storage manager 1210 includes input image 1218 and halftone vector object(s) 1220.

The content design system 1200 generally facilitates the creation, modification, sharing, and/or deletion of graphical content including vector-based content. In one or more embodiments, the content design system 1200 is a design application such as ADOBE® ILLUSTRATOR®. In other embodiments, the content design system 1200 includes multiple applications, functions, and operations relating to graphical content, such as an application suite, a web-based application and/or system operations on a client device.

The content design system 1200 includes a user input manager 1202 that allows users to provide input to the content design system. For example, the user input manager 1202 allows users to select images for which to have a halftone representation automatically generated. In some embodiments, the user input manager 1202 enables a user to select an image file stored or accessible by storage manager 1210, such as input image 1218. In some embodiments, the user input manager 1202 allows users to specify specific settings to be used by halftone generation manager 1208 when generating the halftone representation, such as grid shape, color, etc.

The content design system 1200 further includes halftone generation manager 1208. Halftone generation manager 1208 is responsible for generating a halftone vector representation of an input image, such as input image 1218. The halftone generation manager 1208 includes a grid manager 1212 which determines the grid shape used to divide the input image. For example, as discussed above, the grid shape may include squares, hexagons, etc. For each cell of the selected grid, color manager 1214 can determine the average color of the cell. For example, this average color may be a darkness value (e.g., ranging from 0-1) or other value representing the average of the colors present in the cell. Using the average color of a cell, and the cell shape and size, the halftone manager 1216 can determine a size of the circular halftone element(s) to place in the cell. For example, as discussed above at least with respect to FIGS. 10 and 11, the halftone manager may implement approximate inverse functions to calculate the radius of the halftone elements for the cell based on the average color (e.g., darkness) of that cell. A vector path object can then be generated that includes the appropriately sized halftone elements for each cell. Alternatively, the halftone generation manager 1208 can generate a group of vector objects that collectively form the halftone representation of the input image. The resulting halftone vector object(s) 1220 that comprises the halftone representation of the input image can be displayed to the user and/or stored via storage manager 1210.

As illustrated in FIG. 12, the content design system 1200 also includes the storage manager 1210. The storage manager 1210 maintains data for the content design system 1200. The storage manager 1210 can maintain data of any type, size, or kind as necessary to perform the functions of the content design system 1200. The storage manager 1210, as shown in FIG. 12, includes input image data 1218. Input image data 1218 can include information for any digital image utilized by the content design system 1200. The storage manager 1210 may also include halftone vector object(s) 1220 which comprises the halftone vector representation of the input image as generated by halftone generation manager 1208.

Each of the components 1202-1210 of the content design system 1200 and their corresponding elements (as shown in FIG. 12) may be in communication with one another using any suitable communication technologies. It will be recognized that although components 1202-1210 and their corresponding elements are shown to be separate in FIG. 12, any of components 1202-1210 and their corresponding elements may be combined into fewer components, such as into a single facility or module, divided into more components, or configured into different components as may serve a particular embodiment.

The components 1202-1210 and their corresponding elements can comprise software, hardware, or both. For example, the components 1202-1210 and their corresponding elements can comprise one or more instructions stored on a computer-readable storage medium and executable by processors of one or more computing devices. When executed by the one or more processors, the computer-executable instructions of the content design system 1200 can cause a client device and/or a server device to perform the methods described herein. Alternatively, the components 1202-1210 and their corresponding elements can comprise hardware, such as a special purpose processing device to perform a certain function or group of functions. Additionally, the components 1202-1210 and their corresponding elements can comprise a combination of computer-executable instructions and hardware.

Furthermore, the components 1202-1210 of the content design system 1200 may, for example, be implemented as one or more stand-alone applications, as one or more modules of an application, as one or more plug-ins, as one or more library functions or functions that may be called by other applications, and/or as a cloud-computing model. Thus, the components 1202-1210 of the content design system 1200 may be implemented as a stand-alone application, such as a desktop or mobile application. Furthermore, the components 1202-1210 of the content design system 1200 may be implemented as one or more web-based applications hosted on a remote server. Alternatively, or additionally, the components of the content design system 1200 may be implemented in a suit of mobile device applications or "apps." To illustrate, the components of the content design system 1200 may be implemented in an image processing application, including but not limited to ADOBE® ILLUSTRATOR®. "ADOBE®" and "ILLUSTRATOR®" are either registered trademarks or trademarks of Adobe Inc. in the United States and/or other countries.

Figure 13:
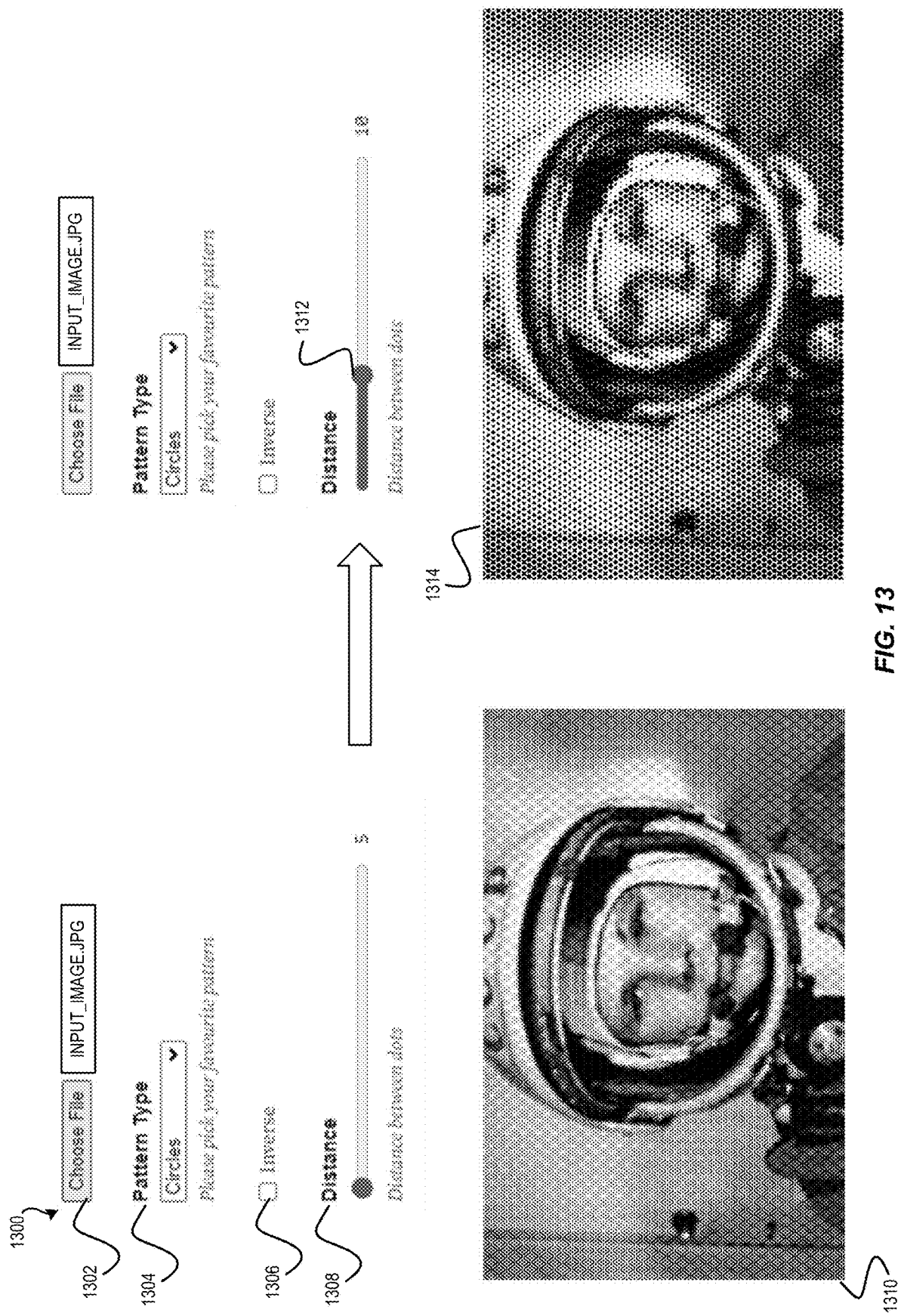
FIG. 13 illustrates an example user interface of a content design system in accordance with one or more embodiments.

FIG. 13 illustrates an example user interface of a content design system in accordance with one or more embodiments. As shown in FIG. 13, a content design system can implement can generate a precise halftone vector representation of an input image. For example, a user can select a "halftone generation" displayed through a user interface. This may cause a user interface element, such as panel 1300 to be displayed in the user interface. Panel 1300 includes a UI element 1302 which enables the user to select an image. As discussed, this may be selected from a local or remote file system, cloud-based storage service, removable media, or other data source. Once selected, the user can select a pattern type 1304. The selected pattern type determines the shape of the halftone element (e.g., circle, etc.) and may also determine the grid shape. For example, the pattern type may include circle elements on a square grid pattern or circle elements on a hexagonal grid (or other patterns). In some embodiments, the user can select to reverse the background and halftone element color. For example, by default the system may use light backgrounds and dark elements. If the user selects inverse 1306, then the system may use dark backgrounds and light elements.

In some embodiments, the user may specify the color of the dark elements and the color of the light elements. Alternatively, default values (e.g., black and white) may be automatically used by the content design system. In some embodiments, the user may select one or more cells of the grid applied to the input image and change the color values of the dark and light elements of those selected cells. For example, the user may select a cell and then input a color value for the dark elements and the color value for the light elements. In some embodiments, if the user enters a custom color value for either the dark elements or the light elements, the content design system may then automatically pick the color for the light or dark elements based on the custom color. For example, the system may automatically select the complementary color for the custom color to be used for the other element. Alternatively, the user may be limited to specifying a custom color for either light or dark elements from a list of colors made available by the system.

The user can also select the distance between the elements using UI element 1308. This enables the user to change the size of the grid, effectively changing the resolution of the resulting halftone image. As shown at 1310, when the distance between the elements is small, the result is a halftone image that is sharp and retains much of the detail of the original input image. If the user interacts with UI element 1308 (e.g., by dragging 1312 the slider to a different distance value (also referred to herein as a resolution value)), they can change the size of the grid. For example, as shown at 1314, the distance between the elements has been increased, increasing the grid size and reducing the resolution. This results in halftone image 1314 which has much larger elements, as they are now representing larger portions of the input image. Similarly, if the user changes the pattern type by interacting with UI element 1304, a new halftone image would be generated based on the new pattern type and the distance value.

Figure 14:
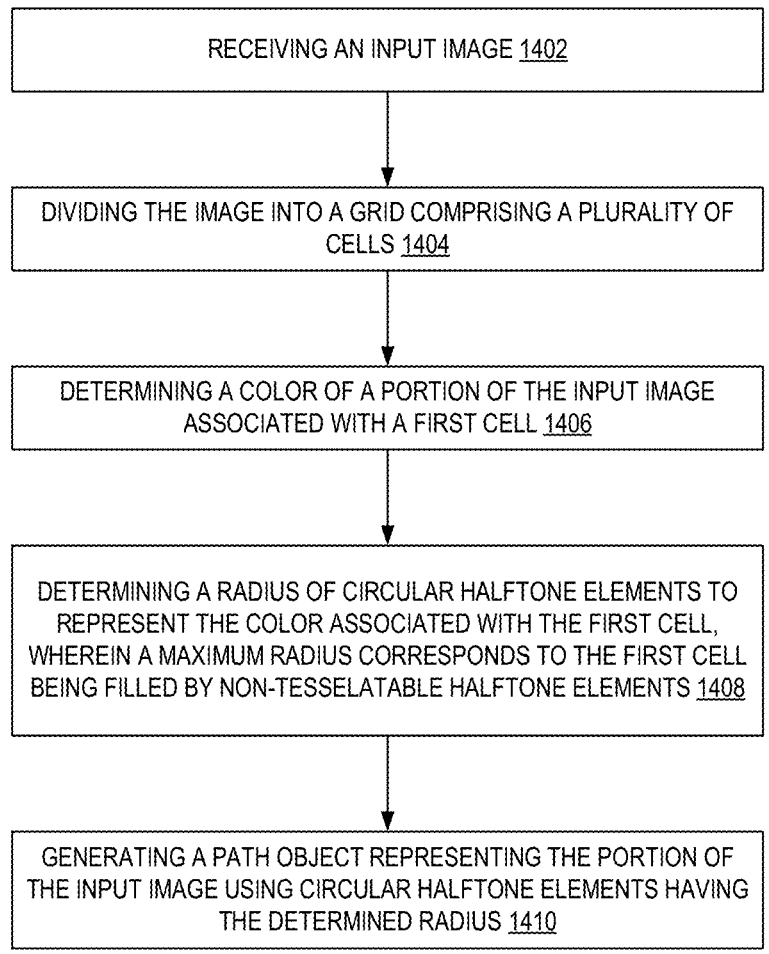
FIG. 14 illustrates a flowchart of a series of acts in a method of precise halftone generation in accordance with one or more embodiments.
Figure 15:
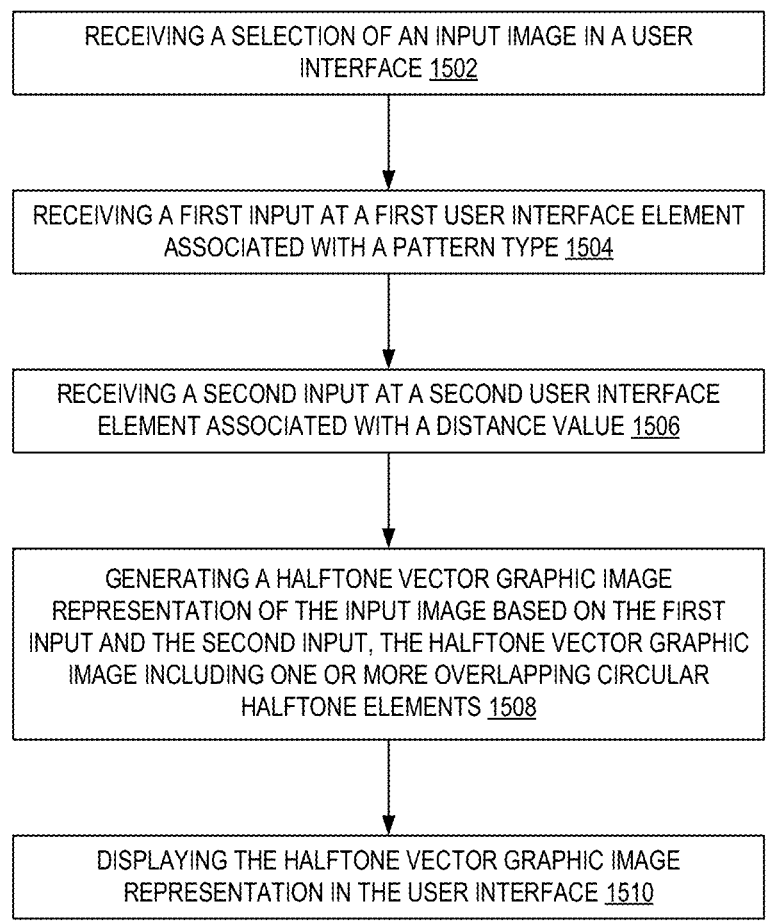
FIG. 15 illustrates a flowchart of a series of acts in a method of precise halftone generation in accordance with one or more embodiments.

FIGS. 1-13, the corresponding text, and the examples, provide a number of different systems and devices that allows a user to facilitate selection of target individuals within digital visual media. In addition to the foregoing, embodiments can also be described in terms of flowcharts comprising acts and steps in a method for accomplishing a particular result. For example, FIGS. 14 and 15 illustrate flowcharts of exemplary methods in accordance with one or more embodiments. The methods described in relation to FIGS. 14 and 15 may be performed with fewer or more steps/acts or the steps/acts may be performed in differing orders. Additionally, the steps/acts described herein may be repeated or performed in parallel with one another or in parallel with different instances of the same or similar steps/acts.

FIGS. 1-13, the corresponding text, and the examples, provide a number of different systems and devices that allows a precise vector halftone representation of an image to be generated. In addition to the foregoing, embodiments can also be described in terms of flowcharts comprising acts and steps in a method for accomplishing a particular result. For example, FIG. 14 illustrates a flowchart of an exemplary method in accordance with one or more embodiments. The method described in relation to FIG. 14 may be performed with fewer or more steps/acts or the steps/acts may be performed in differing orders. Additionally, the steps/acts described herein may be repeated or performed in parallel with one another or in parallel with different instances of the same or similar steps/acts.

FIG. 14 illustrates a flowchart 1400 of a series of acts in a method of precise halftone generation in accordance with one or more embodiments. In one or more embodiments, the method 1400 is performed in a digital medium environment that includes the content design system 1200. The method 1400 is intended to be illustrative of one or more methods in accordance with the present disclosure and is not intended to limit potential embodiments. Alternative embodiments can include additional, fewer, or different steps than those articulated in FIG. 14.

As illustrated in FIG. 14, the method 1400 includes an act 1402 of receiving an input image. The input image may be selected from a local file system, disk drive, or other local or remote storage (e.g., a network-accessible storage location, cloud-based storage service, etc.). In some embodiments, the input image may be uploaded to the content design system. For example, the user may access a cloud-based content design system from a client device via a dedicated application, browser, etc. In some embodiments, the input image is a black and white image. In some embodiments, the input image may include a color image, monochromatic image, etc.

As illustrated in FIG. 14, the method 1400 further includes an act 1404 of dividing the image into a grid comprising a plurality of cells. For example, the user may specify the grid size and shape. In some embodiments, receiving the input image may further include receiving a selection of grid shape and grid size. In some embodiments, the grid shape includes at least one of rectangular, hexagonal, or square.

As illustrated in FIG. 14, the method 1400 further includes an act 1406 of determining a color of a portion of the input image associated with a first cell. For example, an average color of the portion of the image associated with the first cell may be calculated. For example, the median color, modal color, mean color, etc.

As illustrated in FIG. 14, the method 1400 further includes an act 1408 of determining a radius of circular halftone elements to represent the color associated with the first cell, wherein a maximum radius corresponds to the first cell being filled by overlapping circular halftone elements. In some embodiments, determining the radius further includes calculating the radius based on a ratio of an area occupied by the circular halftone elements and a total area of the first cell. In some embodiments, the determined radius causes the circular halftone elements to overlap within the first cell.

As illustrated in FIG. 14, the method 1400 further includes an act 1410 of generating a path object representing the portion of the input image using circular halftone elements having the determined radius. Each cell may be similarly processed until a path object comprising a halftone representation of the entire input image is generated. For example, the method may further include iteratively determining radii for the circular halftone elements to represent colors associated with remaining cells from the plurality of cells, and updating the path object to include a plurality of circular halftone elements having the determined radii, wherein the updated path object comprises a vector halftone representation of the input image.

FIG. 15 illustrates a flowchart 1500 of a series of acts in a method of precise halftone generation in accordance with one or more embodiments. In one or more embodiments, the method 1500 is performed in a digital medium environment that includes the content design system 1200. The method 1500 is intended to be illustrative of one or more methods in accordance with the present disclosure and is not intended to limit potential embodiments. Alternative embodiments can include additional, fewer, or different steps than those articulated in FIG. 15.

As illustrated in FIG. 15, the method 1500 includes an act 1502 of receiving a selection of an input image in a user interface. For example, the user may select an image that is locally stored on, or accessible by, a user device, such as stored on internal or external computer readable storage media. Alternatively, the user may select an image that is stored remotely and is accessible by the user device via one or more networks. In various embodiments, the term "image" or "digital image" refers to a digital graphics file that when rendered displays one or more objects. In particular, the term "image" comprises a digital file that, when rendered, includes visual representations of one or more objects, such as a person. For example, the term "digital image" includes, but is not limited to, digital files with the following file extensions: JPG, TIFF, BMP, PNG, RAW, or PDF. Thus, a digital image includes digital data or a digital file for an image that is displayable via a graphical user interface of a display of a computing device. In some embodiments, the digital image may be a frame of a digital video, and the techniques described herein may be applied to digital videos.

As illustrated in FIG. 15, the method 1500 includes an act 1504 of receiving a first input at a first user interface element associated with a pattern type. As discussed, the user may select the pattern in which the halftone elements are arranged. In some embodiments, the pattern type may include circular elements on a square, rectangular, or hexagonal grid. In some embodiments, the method further includes receiving a third input at the first user interface element changing the pattern type, and generating a new halftone vector graphic image representation of the input image based on the third input and the second input. For example, the user may change the pattern from hexagonal to square, or any other change in pattern from a first pattern to a second pattern.

As illustrated in FIG. 15, the method 1500 includes an act 1506 of receiving a second input at a second user interface element associated with a resolution value. In some embodiments, the resolution value indicates a number of pixels between center points of halftone elements in the halftone vector graphic image representation of the input image. As such, by changing the resolution value, the user can change the size of the grid applied to the input image. This enables the user to adjust the resolution of the halftone image. In some embodiments, the method further includes receiving a third input at the second user interface element changing the resolution value, and generating a new halftone vector graphic image representation of the input image based on the first input and the third input. For the example, the user may increase or decrease the resolution value. In response to this user input, the halftone image is refreshed (e.g., a new halftone image is generated) using the new resolution value.

As illustrated in FIG. 15, the method 1500 includes an act 1508 of generating a halftone vector graphic image representation of the input image based on the first input and the second input, the halftone vector graphic image including one or more overlapping circular halftone elements. In some embodiments, generating a halftone vector graphic image representation of the input image based on the first input and the second input further includes dividing the input image into a grid comprising a plurality of cells, determining a color of a portion of the input image associated with a first cell, determining a radius of circular halftone elements to represent the color associated with the first cell, generating a path object representing the portion of the input image using circular halftone elements having the determined radius, iteratively determining radii for the circular halftone elements to represent colors associated with remaining cells from the plurality of cells, and generating the vector graphic image by updating the path object to include a plurality of circular halftone elements having the determined radii.

As illustrated in FIG. 15, the method 1500 includes an act 1510 of displaying the halftone vector graphic image representation in the user interface. For example, the halftone image may be rendered for display on a user device, such as the screen of a mobile device, a monitor connected to a computing device, or other display device.

In various embodiments, the user interface may also enable the user to change the color of the background and of the halftone elements. For example, the user may select a user interface element to inverse the default colors. For example, by default the halftone elements may be dark (e.g., black), and the background elements may be light (e.g., white). If the user selects an inverse UI element, then the background and halftone element colors may be swapped. In some embodiments, the user may be enabled to select the colors of some or all of the halftone elements and the background. For example, a color selection UI element may enable the user to select the color visually or enter a code corresponding to the color value to be used. In some embodiments, the user may select individual cells and change the color of the halftone elements and/or backgrounds of just the selected cells.

Figure 16:
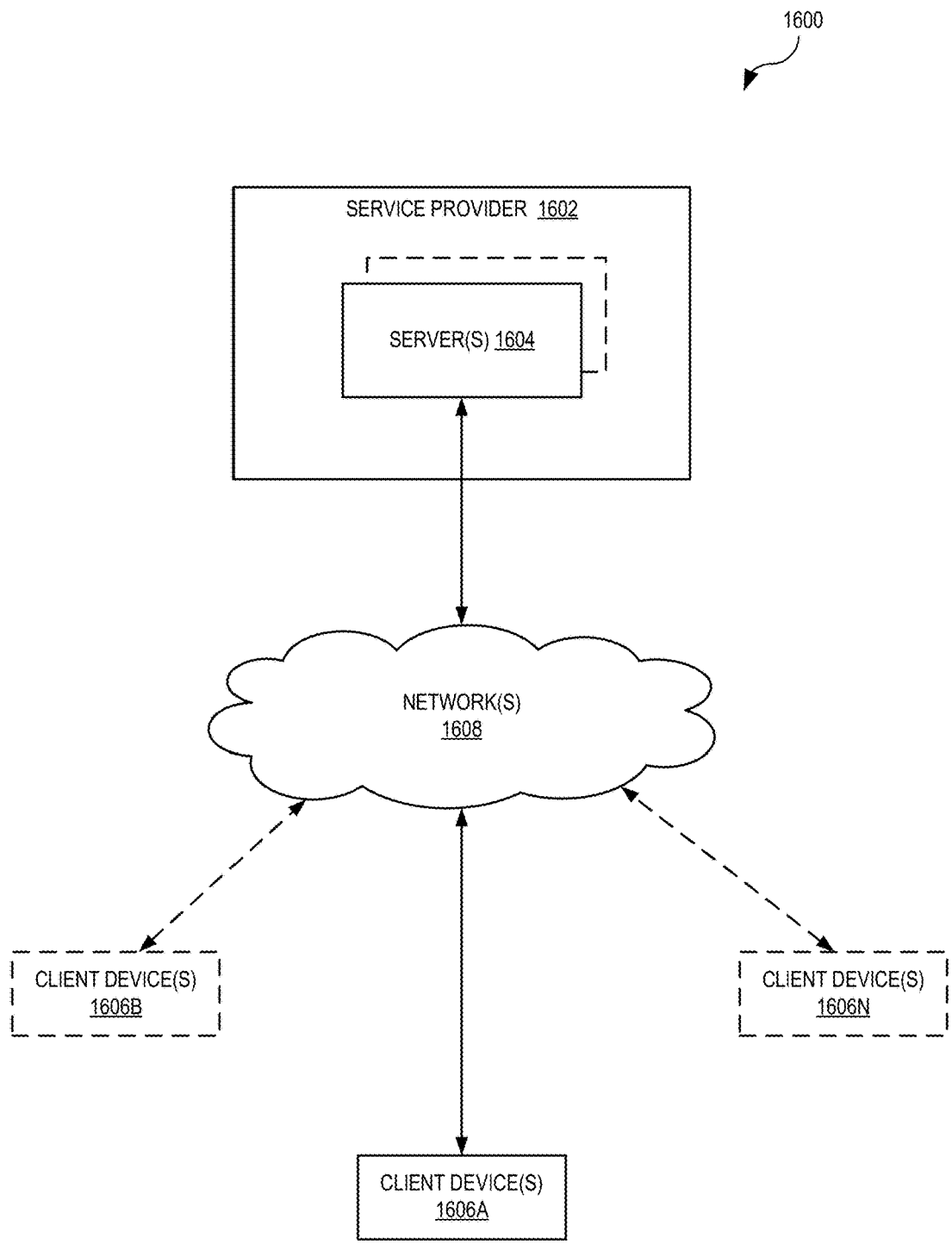
FIG. 16 illustrates a schematic diagram of an exemplary environment in which the image processing system can operate in accordance with one or more embodiments.

FIG. 16 illustrates a schematic diagram of an exemplary environment 1600 in which the content design system 1200 can operate in accordance with one or more embodiments. In one or more embodiments, the environment 1600 includes a service provider 1602 which may include one or more servers 1604 connected to a plurality of client devices 1606A-1606N via one or more networks 1608. The client devices 1606A-1606N, the one or more networks 1608, the service provider 1602, and the one or more servers 1604 may communicate with each other or other components using any communication platforms and technologies suitable for transporting data and/or communication signals, including any known communication technologies, devices, media, and protocols supportive of remote data communications, examples of which will be described in more detail below with respect to FIG. 17.

Although FIG. 16 illustrates a particular arrangement of the client devices 1606A-1606N, the one or more networks 1608, the service provider 1602, and the one or more servers 1604, various additional arrangements are possible. For example, the client devices 1606A-1606N may directly communicate with the one or more servers 1604, bypassing the network 1608. Or alternatively, the client devices 1606A-1606N may directly communicate with each other. The service provider 1602 may be a public cloud service provider which owns and operates their own infrastructure in one or more data centers and provides this infrastructure to customers and end users on demand to host applications on the one or more servers 1604. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1604. In some embodiments, the service provider may be a private cloud provider which maintains cloud infrastructure for a single organization. The one or more servers 1604 may similarly include one or more hardware servers, each with its own computing resources, which are divided among applications hosted by the one or more servers for use by members of the organization or their customers.

Similarly, although the environment 1600 of FIG. 16 is depicted as having various components, the environment 1600 may have additional or alternative components. For example, the environment 1600 can be implemented on a single computing device with the content design system 1200. In particular, the content design system 1200 may be implemented in whole or in part on the client device 1602A.

As illustrated in FIG. 16, the environment 1600 may include client devices 1606A-1606N. The client devices 1606A-1606N may comprise any computing device. For example, client devices 1606A-1606N may comprise one or more personal computers, laptop computers, mobile devices, mobile phones, tablets, special purpose computers, TVs, or other computing devices, including computing devices described below with regard to FIG. 17. Although three client devices are shown in FIG. 16, it will be appreciated that client devices 1606A-1606N may comprise any number of client devices (greater or smaller than shown).

Moreover, as illustrated in FIG. 16, the client devices 1606A-1606N and the one or more servers 1604 may communicate via one or more networks 1608. The one or more networks 1608 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1608 may be any suitable network over which the client devices 1606A-1606N may access service provider 1602 and server 1604, or vice versa. The one or more networks 1608 will be discussed in more detail below with regard to FIG. 17.

In addition, the environment 1600 may also include one or more servers 1604. The one or more servers 1604 may generate, store, receive, and transmit any type of data, including input image data 1218, halftone vector object(s) data 1220, or other information. For example, a server 1604 may receive data from a client device, such as the client device 1606A, and send the data to another client device, such as the client device 1602B and/or 1602N. The server 1604 can also transmit electronic messages between one or more users of the environment 1600. In one example embodiment, the server 1604 is a data server. The server 1604 can also comprise a communication server or a web-hosting server. Additional details regarding the server 1604 will be discussed below with respect to FIG. 17.

As mentioned, in one or more embodiments, the one or more servers 1604 can include or implement at least a portion of the content design system 1200. In particular, the content design system 1200 can comprise an application running on the one or more servers 1604 or a portion of the content design system 1200 can be downloaded from the one or more servers 1604. For example, the content design system 1200 can include a web hosting application that allows the client devices 1606A-1606N to interact with content hosted at the one or more servers 1604. To illustrate, in one or more embodiments of the environment 1600, one or more client devices 1606A-1606N can access a webpage supported by the one or more servers 1604. In particular, the client device 1606A can run a web application (e.g., a web browser) to allow a user to access, view, and/or interact with a webpage or website hosted at the one or more servers 1604.

Upon the client device 1606A accessing a webpage or other web application hosted at the one or more servers 1604, in one or more embodiments, the one or more servers 1604 can provide access to one or more digital images (e.g., the input image data 1218, such as camera roll or an individual's personal photos) stored at the one or more servers 1604. Moreover, the client device 1606A can receive a request (i.e., via user input) to generate a vector halftone representation of an input image and provide the request to the one or more servers 1604. Upon receiving the request, the one or more servers 1604 can automatically perform the methods and processes described above to generate a vector halftone representation of the input image. The one or more servers 1604 can provide the resulting vector object(s) that comprises the halftone representation, to the client device 1606A for display to the user.

As just described, the content design system 1200 may be implemented in whole, or in part, by the individual elements 1602-1608 of the environment 1600. It will be appreciated that although certain components of the content design system 1200 are described in the previous examples with regard to particular elements of the environment 1600, various alternative implementations are possible. For instance, in one or more embodiments, the content design system 1200 is implemented on any of the client devices 1606A-N. Similarly, in one or more embodiments, the content design system 1200 may be implemented on the one or more servers 1604. Moreover, different components and functions of the content design system 1200 may be implemented separately among client devices 1606A-1606N, the one or more servers 1604, and the network 1608.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
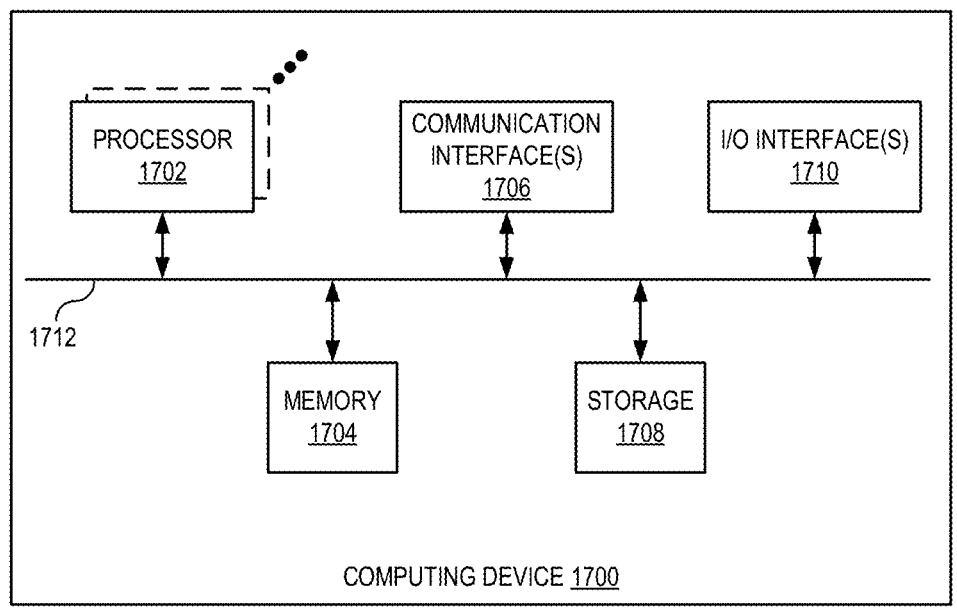
FIG. 17 illustrates a block diagram of an exemplary computing device in accordance with one or more embodiments.

FIG. 17 illustrates, in block diagram form, an exemplary computing device 1700 that may be configured to perform one or more of the processes described above. One will appreciate that one or more computing devices such as the computing device 1700 may implement the image processing system. As shown by FIG. 17, the computing device can comprise a processor 1702, memory 1704, one or more communication interfaces 1706, a storage device 1708, and one or more I/O devices/interfaces 1710. In certain embodiments, the computing device 1700 can include fewer or more components than those shown in FIG. 17. Components of computing device 1700 shown in FIG. 17 will now be described in additional detail.

In particular embodiments, processor(s) 1702 includes hardware for executing instructions, such as those making up a computer program. As an example, and not by way of limitation, to execute instructions, processor(s) 1702 may retrieve (or fetch) the instructions from an internal register, an internal cache, memory 1704, or a storage device 1708 and decode and execute them. In various embodiments, the processor(s) 1702 may include one or more central processing units (CPUs), graphics processing units (GPUs), field programmable gate arrays (FPGAs), systems on chip (SoC), or other processor(s) or combinations of processors.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1704 may be internal or distributed memory.

The computing device 1700 can further include one or more communication interfaces 1706. A communication interface 1706 can include hardware, software, or both. The communication interface 1706 can provide one or more interfaces for communication (such as, for example, packet-based communication) between the computing device and one or more other computing devices 1700 or one or more networks. As an example and not by way of limitation, communication interface 1706 may include a network interface controller (NIC) or network adapter for communicating with an Ethernet or other wire-based network or a wireless NIC (WNIC) or wireless adapter for communicating with a wireless network, such as a WI-FI. The computing device 1700 can further include a bus 1712. The bus 1712 can comprise hardware, software, or both that couples components of computing device 1700 to each other.

The computing device 1700 includes a storage device 1708 includes storage for storing data or instructions. As an example, and not by way of limitation, storage device 1708 can comprise a non-transitory storage medium described above. The storage device 1708 may include a hard disk drive (HDD), flash memory, a Universal Serial Bus (USB) drive or a combination these or other storage devices. The computing device 1700 also includes one or more input or output ("I/O") devices/interfaces 1710, which are provided to allow a user to provide input to (such as user strokes), receive output from, and otherwise transfer data to and from the computing device 1700. These I/O devices/interfaces 1710 may include a mouse, keypad or a keyboard, a touch screen, camera, optical scanner, network interface, modem, other known I/O devices or a combination of such I/O devices/interfaces 1710. The touch screen may be activated with a stylus or a finger.

The I/O devices/interfaces 1710 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1710 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

I claim:

1. A computer-implemented method comprising:
receiving an input image;
dividing the input image into a grid comprising a plurality of cells;
determining a color of a portion of the input image associated with a first cell;
determining a radius of circular halftone elements to represent the color associated with the first cell, wherein a maximum radius corresponds to the first cell being filled by non-tesselatable halftone elements; and
generating a path object representing the portion of the input image using circular halftone elements having the determined radius.

2. The computer-implemented method of claim 1, further comprising:
iteratively determining radii for the circular halftone elements to represent colors associated with remaining cells from the plurality of cells; and
updating the path object to include a plurality of circular halftone elements having the determined radii, wherein the updated path object comprises a vector halftone representation of the input image.

3. The computer-implemented method of claim 1, wherein receiving an input image further comprises:
receiving a selection of grid shape and grid size.

4. The computer-implemented method of claim 3, wherein the grid shape includes at least one of hexagonal or square.

5. The computer-implemented method of claim 1, wherein determining a radius of circular halftone elements to represent the color associated with the first cell further comprises:
calculating the radius based on a ratio of an area occupied by the circular halftone elements and a total area of the first cell.

6. The computer-implemented method of claim 5, wherein the determined radius causes the circular halftone elements to overlap within the first cell.

7. The computer-implemented method of claim 1, wherein the input image is a black and white image.

8. The computer-implemented method of claim 1, wherein the non-tesselatable halftone elements include overlapping circular halftone elements.

9. A non-transitory computer-readable storage medium including instructions stored thereon which, when executed by at least one processor, cause the at least one processor to:
receive an input image;
divide the input image into a grid comprising a plurality of cells;
determine a color of a portion of the input image associated with a first cell;
determine a radius of circular halftone elements to represent the color associated with the first cell, wherein a maximum radius corresponds to the first cell being filled by overlapping circular halftone elements; and
generate a path object representing the portion of the input image using circular halftone elements having the determined radius.

10. The non-transitory computer-readable storage medium of claim 9, wherein the instructions, when executed, further cause the at least one processor to:
iteratively determine radii for the circular halftone elements to represent colors associated with remaining cells from the plurality of cells; and
update the path object to include a plurality of circular halftone elements having the determined radii, wherein the updated path object comprises a vector halftone representation of the input image.

11. The non-transitory computer-readable storage medium of claim 9, wherein to receive an input image, the instructions, when executed, further cause the at least one processor to:
receive a selection of grid shape and grid size.

12. The non-transitory computer-readable storage medium of claim 11, wherein the grid shape includes at least one of hexagonal or square.

13. The non-transitory computer-readable storage medium of claim 9, wherein to determine a radius of circular halftone elements to represent the color associated with the first cell, the instructions, when executed, further cause the at least one processor to:
calculate the radius based on a ratio of an area occupied by the circular halftone elements and a total area of the first cell.

14. The non-transitory computer-readable storage medium of claim 13, wherein the determined radius causes the circular halftone elements to overlap within the first cell.

15. The non-transitory computer-readable storage medium of claim 9, wherein the input image is a black and white image.

16. A computer-implemented method comprising:
receiving a selection of an input image in a user interface;
receiving a first input at a first user interface element associated with a pattern type;
receiving a second input at a second user interface element associated with a resolution value;
generating a halftone vector graphic image representation of the input image based on the first input and the second input, the halftone vector graphic image including one or more overlapping circular halftone elements; and displaying the halftone vector graphic image representation in the user interface.

17. The computer-implemented method of claim 16, wherein generating a halftone vector graphic image representation of the input image based on the first input and the second input, the halftone vector graphic image including one or more overlapping circular halftone elements further comprises:

dividing the input image into a grid comprising a plurality of cells;

determining a color of a portion of the input image associated with a first cell;

determining a radius of circular halftone elements to represent the color associated with the first cell;

generating a path object representing the portion of the input image using circular halftone elements having the determined radius;

iteratively determining radii for the circular halftone elements to represent colors associated with remaining cells from the plurality of cells; and generating the vector graphic image by updating the path object to include a plurality of circular halftone elements having the determined radii.

18. The computer-implemented method of claim 16, wherein the pattern type includes circular elements on a square, rectangular, or hexagonal grid.

19. The computer-implemented method of claim 16, wherein the resolution value indicates a number of pixels between center points of halftone elements in the halftone vector graphic image representation of the input image.

20. The computer-implemented method of claim 16, further comprising:

receiving a third input at the second user interface element changing the resolution value; and generating a new halftone vector graphic image representation of the input image based on the first input and the third input.

* * * * *